United States Patent
Dee

[15] 3,647,272
[45] Mar. 7, 1972

[54] FLUID BEARINGS

[72] Inventor: Colin W. Dee, Wimborne, England

[73] Assignee: Aerostatic Limited, Poole, Dorset, England

[22] Filed: Nov. 7, 1969

[21] Appl. No.: 874,772

Related U.S. Application Data

[63] Continuation-in-part of Ser. No. 792,220, Jan. 14, 1969.

[30] Foreign Application Priority Data

Nov. 22, 1968 Great Britain..................55,455/68

[52] U.S. Cl. ..................................................308/9
[51] Int. Cl. ..........................................F16c 17/16
[58] Field of Search ..............................308/9, 72

[56] References Cited

UNITED STATES PATENTS

| | | | |
|---|---|---|---|
| 2,449,297 | 9/1948 | Hoffer | 308/9 |
| 2,095,313 | 10/1937 | Carter et al. | 308/9 |
| 3,013,845 | 12/1961 | Loch | 308/9 |
| 3,068,551 | 12/1962 | Cobb | 308/72 |
| 3,256,451 | 6/1966 | Shipman | 308/9 |
| 3,368,850 | 2/1968 | Wilcox | 308/9 |

Primary Examiner—Edgar W. Geoghegan
Assistant Examiner—F. S. Frank Susko
Attorney—William Anthony Drucker

[57] ABSTRACT

In a fluid journal bearing an outer bearing member has a first annular element with a radial face and a second annular element with a radial face which is butted up against the radial face of the first element, one or both of the radial faces being recessed axially at angular intervals such that a plurality of radial slots is defined by the abutting faces, an annular wrapper encircling the first and second elements and retaining them in coaxial abutted condition.

5 Claims, 4 Drawing Figures

INVENTOR:
COLIN W. DEE

FLUID BEARINGS

This is a continuation-in-part of my copending U.S. Pat. application Ser. No. 792,220 filed Jan. 14th 1969.

This invention relates to fluid journal bearings of that kind in which fluid under pressure, supplied from an external source, is fed to a bearing gap defined between inner and outer bearing members.

The fluid in such bearings is conventionally supplied to the bearing gap through a series of orifices which are spaced circumferentially about that surface, of one or the other of the bearing members, which forms a boundary to the bearing gap.

In my U.S. Pat. application No. 557,231 now U.S. Pat. No. 3,510,175 there is described and claimed a construction of fluid journal bearing in which the fluid is fed to the bearing gap through a series of radial slots spaced circumferentially on the gap-bounding surface of one of the bearing members.

In the production of fluid bearings, it is desirable to be able to produce outer bearing members, e.g., stator members for coaction with a plain shaft acting as the inner bearing member, in the form of a compact and sturdy unit which permits assembly under factory conditions without requiring fine work to close tolerances at the time of assembly. Nevertheless, it will be well known to those skilled in the art of fluid bearings that the dimensions of the bearing gaps and of the fluid feed passages are commonly of a very low order such as a few thousandths of an inch.

It is accordingly the object of the present invention to provide an improved construction of outer bearing member, for a fluid journal bearing, in which the individual elements can be easily produced with dimensions within fine limits and can thereafter be assembled by relatively unskilled labor to constitute robust permanently assembled units requiring a minimum of material and of compact size permitting inter alia the substitution of the bearing member for certain ball races.

According to the present invention, an outer bearing member for a fluid journal bearing comprises a first annular element having a radial face, a second annular element having a radial face butted up against the radial face of the first element, one or both of said radial faces being recessed axially at angular intervals such that a plurality of radial slots is defined by the butted faces, and an annular wrapper encircling the first and second elements and retaining them in coaxial butted condition.

The number of annular elements positioned within the annular wrapper is not limited to two, and there may be three or more arranged in coaxial butted condition. In a preferred arrangement there is a third annular element, and a first circumferential series of slots is defined between the first and second annular elements, and a second circumferential series of slots is defined between the second and third annular elements.

The, or each, circumferential series of slots opens at the inner end of the slots to the journal bearing gap. The outer end of the slots of the or each series of slots may open into a common feed passage, and in a preferred arrangement there is provided a common annular feed passage which is defined between the two elements and the wrapper. Where two or more such annular passages are provided for respective circumferential series of slots, said passages may communicate through axially running channels in an annular element.

The annular elements may be retained in the annular wrapper merely as a tight push- or friction-fit, or by any convenient mechanical securing means, but in a preferred arrangement, the two or more annular elements are made a close tolerance fit in a bore in the annular wrapper, and a portion, such as a lip or a plurality of lugs, on the annular wrapper is upset, e.g., spun, against the two annular elements, or two end annular elements, after insertion, to retain them in coaxial condition.

In order that the nature of the invention may be readily ascertained, two embodiments of fluid journal bearing in accordance therewith are hereinafter particularly described with reference to the accompanying drawing, wherein.

Figure 1:
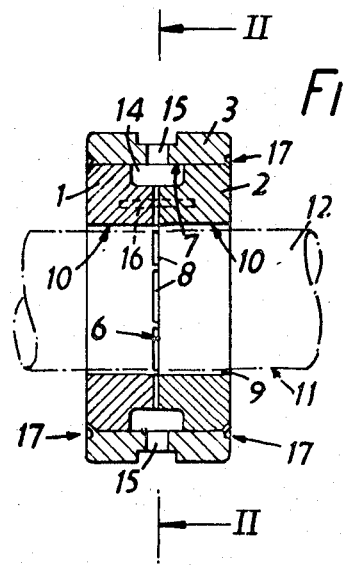
FIG. 1 is an axial section of a first embodiment of fluid journal bearing having a single circumferential series of feed slots.
Figure 2:
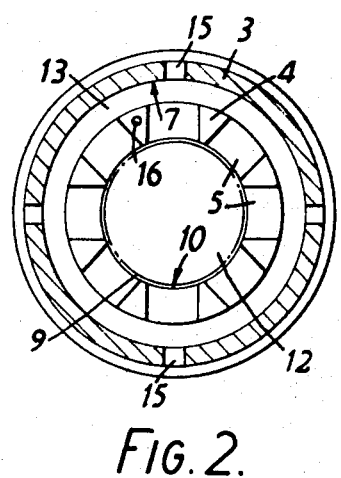
FIG. 2 is a section taken on the line II—II of FIG. 1.

Referring to FIGS. 1 and 2, the fluid journal bearing comprises a first annular element 1, a second annular element 2, and an annular wrapper 3.

The annular element 1 has a radial face 4 which is provided with four diametral parallel-sided axially extending recesses 5.

The annular element 2 has a plane radial face 6.

When the two annular elements 1 and 2 are assembled, in the bore 7 of the wrapper 3, with their faces 4 and 6 coaxially aligned and butted one against the other, there is defined between the two annular elements a circumferential series of slots 8 which all open at their inner end into a journal bearing gap 9 defined, in the eventual assembled bearing, between the inner surfaces 11 of a plain shaft 12 acting as the inner bearing member.

Each of the annular elements 1 and 2 is provided with an annular recess 13 and when the annular elements are assembled in the wrapper 3 the recesses 13 together form an annular feed passage 14 into which all of the feed slots 8 open at their outer end. The wrapper 3 is provided with opposed openings 15 for introduction of fluid under pressure from an external source.

To facilitate assembly of the annular elements 1 and 2 and to maintain them in the correct relative angular position there are provided keying means consisting of a pin 16 engaged into aligned holes in the elements 1 and 2.

When the annular elements have been assembled into the wrapper 3, small edge portions 17 of the wrapper 3 are spun over the adjacent periphery of the elements 1 and 2, thereby to retain them firmly in assembly.

Figure 3:
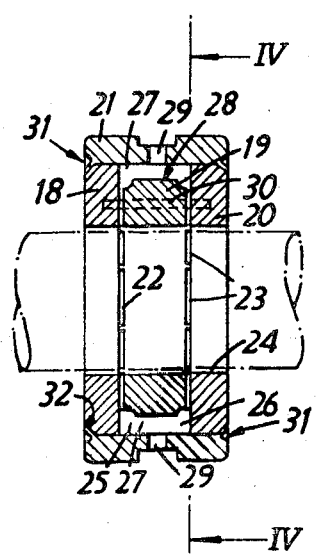
FIG. 3 is an axial section of a second embodiment of fluid journal bearing having two circumferential series of feed slots.
Figure 4:
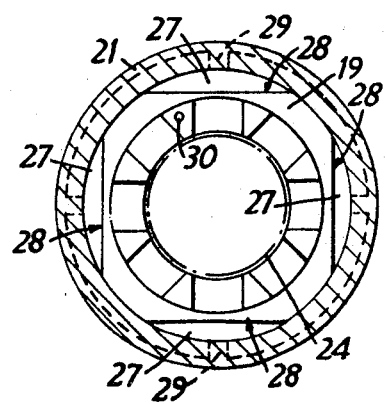
FIG. 4 is a section taken on the line IV—IV of FIG. 3.

Referring to FIGS. 3 and 4, there are provided a first annular end element 18, an intermediate annular sleeve element 19, a second annular end element 20, and an annular wrapper 21.

Between the end element 18 and the sleeve element 19 there is formed a similar circumferential row of slots 22, and between the sleeve element 19 and the end element 20 there is formed a similar circumferential row of slots 23. The slots of each row of slots open at their inner end into a common journal bearing gap 24, and at their outer end into respective annular feed passages 25, 26 defined between the respective butted pairs of elements. The sleeve 19 is also provided with axially running channels 27 formed by cutting the sleeve at planes 28 and providing a communication to the feed passages 25, 26 from common fluid feed openings 29.

The elements 18, 19 and 20 are keyed against rotation one with respect to the other by the pin 30 passed through a bore in the sleeve 19, and engaging into holes in the elements 18 and 20. The elements 18, 19 and 20 are held axially in assembly by spinning of edge portions 31 of the wrapper against the periphery of the end elements 18, 31 and 20.

The single row of slots in FIGS. 1 and 2, or the double row of slots in FIGS. 3 and 4, could be defined by providing similar recesses in both of the butted faces, and positioning them in alignment with either a recess or a land of the opposed element.

The two or more elements disposed within the wrapper may be all of the same internal and/or external diameter and all provided with plain cylindrical surfaces. The wrapper may be cylindrical and plain both inside and out, and as it acts merely to align the elements radially and tie them axially it can be relatively thin radially and thus be in the form of a sleeve, e.g., cut from a length of tube.

It is simple to assemble two or more elements axially in a plain bore in the wrapper and thereafter deform the wrapper radially inwardly at its extremes to provide keying at both ends. For compactness, the outer periphery of the elements is preferably cut away or chamfered as at 32 to receive the upset portion of the wrapper.

I claim

1. For a fluid journal bearing, an outer bearing member comprising a first annular element having a radial face, a second annular element having a radial face butted up against the radial face of said first annular element, said butted radial face of said first annular element, said butted radial faces defining between them a plurality of angularly spaced radial parallel sided fluid feed slots in a row, and an annular wrapper positioned about said first and second elements and engaging with said annular elements to retain them in coaxial abutted condition and means in said wrapper for feeding fluid therethrough and wherein portions of said wrapper are upset against said first and second annular elements to retain them in abutted relationship.

2. An outer bearing member, as claimed in claim 1, comprising a third annular element disposed between and in abutment with said first and second annular elements, a first plurality of slots being defined between said first and third annular elements, and a second plurality of slots being defined between said second and third annular elements.

3. An outer bearing member, as claimed in claim 2, wherein said first and third annular elements and said wrapper together define a first annular feed passage, said second and third annular elements and said wrapper together define a second annular feed passage, and said third annular element and said wrapper together define axial channel means communicating with said first and second annular feed passages.

4. An outer bearing member, as claimed in claim 2, wherein said first and second and third annular elements are disposed in a cylindrical bore in said wrapper, and wherein portions of said wrapper are upset against said first and second annular elements to retain said first and second and third annular elements in abutted relationship.

5. An outer bearing member, as claimed in claim 2, comprising keying means engaged with said first and second and third annular elements to locate and retain them in a required position of relative rotation.

* * * * *